Figure 1:
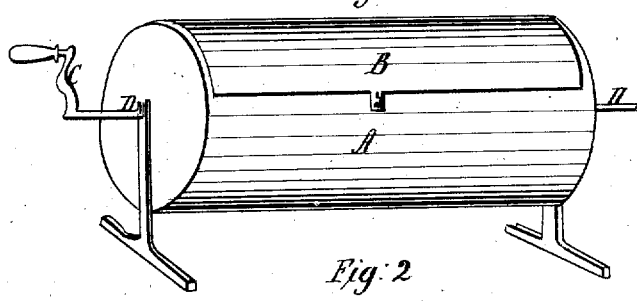
Figure 2:
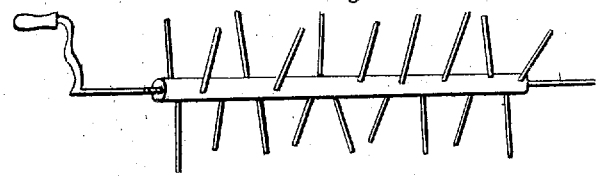

The specification in this patent is not in print.

8004X

G. Reynolds.

Feather Renovator.

No. Patented Feb. 7, 1834.

THE NORRIS PETERS CO., WASHINGTON, D.C.

8004X

Feb 7 1834

George Reynolds of East Hartford Connecticut
Letters Patent. (Patented Feb. 7. 1834)

The Schedule referred to in these Letters Patent and making part of the same containing a description in the words of the said George Reynolds himself of his improvement in the machine for dressing over old feathers, and preparing new ones for putting into Beds.

To all to whom these presents shall come: Be it known that I George Reynolds of East Hartford in the County of Hartford and State of Connecticut, have invented a new and useful machine for dressing over old feathers and preparing new ones for Beds. and that the following is a full and exact description of the construction and operation of the said Machine as invented by me. This machine consists of a cylinder or Barrel of sheet iron. three feet more or less in length, and 18 inches more or less in diameter. On one side of this cylinder is a door, which for convenience should be nearly the whole length of the cylinder, and of a convenient width for putting in and emptying out the feathers. Through the centre of the cylinder from end to end runs a wooden shaft, of a size sufficient for inserting the dressing pins. which may be of large wire, or of any material which may be thought suitable. The number and lengths of these pins may be varied according to the size and length of the machine, and the judgment of the operator. In the centre of each end of the cylinder is a hole through which the gudgeons pass and screw into the end of the shaft. The gudgeon connected with the crank has a nut on it outside of the end of the cylinder. which is screwed up so as to pinch the sheet iron between the nut and the end of the wooden shaft. holding the cylinder and shaft firm together. These gudgeons may be screwed out and the shaft taken out at pleasure. The end of the cylinder next the crank, is not fastened to the body of the cylinder, but made with a narrow rim similar to the cover of a snuff box, and sets close within the end of the cylinder and can be taken out when necessary. To use this machine if in a room at the 8004X Feb 7, 1834 a fire place. a sort of stove or pen suited to the size of the machine
may be built up of Brick on the hearth, filling up the fire place
except an opening at top for taking off the smoke.
In the front of the Brick work several small holes should be
left for a draught of air to feed the fire. which is made on the bot
tom. over the top a cover of sheet iron or something which will be
secure against fire, should be placed to preserve the heat and carry
off the smoke into the chimney. This cover or lid may be hung with
hinges so as to raise up or shut down at pleasure. In the ends
of this Brick work should be left narrow openings. just suffi-
cient to let down the gudgeons so as to bring the machine within a
proper distance of the fire. At the bottom of those openings or crev-
ices, suitable boxes are placed for the gudgeons to turn upon. The
feathers to be dressed. are first well washed, and when about half
dry are in proper order for dressing. A sufficient quantity for the
machine to operate upon, are now put into it, and placed over the
fire. and turned slowly, till the feathers are entirely dry, which may
be known by the ceasing of steam coming from them through a small
hole, or holes, made in one or both of the ends of the cylinder for that
purpose. The feathers are carried round with the cylinder till they
come to the top, when they fall to the bottom, the pins at the same time
separating the feathers, and working them up loose, and however dead
and matted before, they come from the machine as light and lively as
any new feathers. By this process every bad smell is entirely
destroyed, and every insect or knit also destroyed. When one batch
or filling of the machine is done, the machine is taken out and placed
upon stanchions, when by opening the door and turning it down, the
feathers are emptied out. then turning the door up again to the
top the machine is filled again. and placed over the fire.
East Hartford January 21. 1834

Exd. Witnesses George Reynolds
[illegible] Solomon Olmsted
Theodore L. Wright Drawing (868 words)
([illegible])